US011060756B2

(12) United States Patent
Combs (10) Patent No.: US 11,060,756 B2
(45) Date of Patent: Jul. 13, 2021

(54) INSULATED REGISTER BOX AND PROCESS FOR FORMING SUCH INSULATED REGISTER BOX

(71) Applicant: STERLING CUSTOM SHEET METAL, INC., Magnolia, TX (US)

(72) Inventor: Sterling Kidd Combs, Magnolia, TX (US)

(*) Notice: Subject to any disclaimer, the term of this patent is extended or adjusted under 35 U.S.C. 154(b) by 416 days.

(21) Appl. No.: 16/036,059

(22) Filed: Jul. 16, 2018

(65) Prior Publication Data
US 2018/0363942 A1 Dec. 20, 2018

Related U.S. Application Data (60) Continuation-in-part of application No. 16/005,235, filed on Jun. 11, 2018, and a continuation-in-part of application No. 15/864,612, filed on Jan. 8, 2018, now Pat. No. 10,995,969, said application No. 16/005,235 is a continuation-in-part of application
(Continued)

(51) Int. Cl.
| | |
|---|---|
| *F24F 13/08* | (2006.01) |
| *B29C 44/18* | (2006.01) |
| *F24F 13/06* | (2006.01) |
| *B29C 41/20* | (2006.01) |
| *B29C 44/14* | (2006.01) |
| *B29C 44/36* | (2006.01) |
| *B29K 105/00* | (2006.01) |
| *B29K 75/00* | (2006.01) |

(52) U.S. Cl.
CPC .............. *F24F 13/082* (2013.01); *B29C 41/20* (2013.01); *B29C 44/14* (2013.01); *B29C 44/18* (2013.01); *F24F 13/06* (2013.01); *B29C 44/36* (2013.01); *B29C 44/367* (2013.01); *B29K 2075/00* (2013.01); *B29K 2105/0058* (2013.01); *B29K 2995/0015* (2013.01)

(58) Field of Classification Search
CPC ......... Y10T 428/233; Y10T 428/24996; Y10T 428/24512
USPC ........................ 454/330; 139/149; 138/141
See application file for complete search history.

(56) References Cited

U.S. PATENT DOCUMENTS 2,356,827 A * 8/1944 Coss ...................... F25D 23/064
52/742.11
3,559,560 A * 2/1971 Trahan .................. F24F 13/082
454/299
(Continued)

FOREIGN PATENT DOCUMENTS

EP 1985940 A1 * 10/2008 .............. F24F 13/06

*Primary Examiner* — Edelmira Bosques
*Assistant Examiner* — Frances F. Hamilton (57) ABSTRACT

A register box for an HVAC installation has a body with a plurality of side panels arranged in a generally rectangular or square configuration and a plurality of flanges extending inwardly from the plurality of side panels, an expandable polymeric material affixed to an inner side of each of the plurality of side panels such that the expandable polymeric material has a portion extending across one end of the body inwardly of the plurality of flanges, and a sheet positioned over the portion of the expandable polymeric material at the one end of the body such that the sheet is interposed between the plurality of flanges and the portion of the expandable polymeric material. The expandable polymeric material and the sheet are cuttable so as to open to the interior of the register box.

8 Claims, 7 Drawing Sheets

Related U.S. Application Data

No. 15/703,436, filed on Sep. 13, 2017, now Pat. No. 10,648,695, which is a continuation-in-part of application No. 15/439,454, filed on Feb. 22, 2017, now Pat. No. 10,309,682, which is a continuation-in-part of application No. 14/668,079, filed on Mar. 25, 2015, now Pat. No. 9,951,969, said application No. 15/864,612 is a division of application No. 14/668,079, filed on Mar. 25, 2015, now Pat. No. 9,951,969.

(56) References Cited

U.S. PATENT DOCUMENTS

| | | | | |
|---|---|---|---|---|
| 3,985,158 A * | 10/1976 | Felter | F16L 9/12 | 138/149 |
| 4,117,773 A * | 10/1978 | Johnson | B66C 13/54 | 137/580 |
| 4,159,674 A * | 7/1979 | Brumleu, Jr. | B32B 5/08 | 454/297 |
| 4,744,488 A * | 5/1988 | Nelson | F24H 1/182 | 220/567.3 |
| 5,388,904 A * | 2/1995 | Kuwahara | B29C 44/18 | 312/406.2 |
| 5,658,196 A * | 8/1997 | Swaim | F24F 13/062 | 454/292 |
| 5,807,171 A * | 9/1998 | Felsen | F24F 13/06 | 454/296 |
| 6,000,437 A * | 12/1999 | Ponder | F16L 59/026 | 138/128 |
| 6,360,783 B2 * | 3/2002 | Faverio, IV | F16L 59/147 | 138/143 |
| 6,579,170 B1 * | 6/2003 | Davis | F16L 9/14 | 138/149 |
| 7,699,078 B1 * | 4/2010 | Husmann, Jr. | F24F 13/0263 | 138/114 |
| 8,667,995 B1 * | 3/2014 | Fanelli | F16L 9/003 | 138/112 |
| 10,309,682 B2 * | 6/2019 | Combs | F24F 13/06 | |
| 10,322,843 B2 * | 6/2019 | Givens, Jr. | B32B 5/18 | |
| 10,365,005 B2 * | 7/2019 | Surraco | B32B 9/041 | |
| 2003/0011290 A1 * | 1/2003 | Austin | F24F 13/20 | 312/326 |
| 2003/0051764 A1 * | 3/2003 | Jungers | B29C 41/22 | 138/149 |
| 2005/0055973 A1 * | 3/2005 | Hagen, Jr. | E04B 1/7604 | 52/741.1 |
| 2008/0045137 A1 * | 2/2008 | Rosal | F24F 13/0245 | 454/292 |
| 2008/0047627 A1 * | 2/2008 | Jungers | F16L 59/143 | 138/141 |
| 2014/0261846 A1 * | 9/2014 | Lanciaux | E04C 2/328 | 138/141 |
| 2015/0204573 A1 * | 7/2015 | Gray | B32B 37/14 | 428/43 |
| 2016/0102183 A1 * | 4/2016 | Sobotka | C08J 9/00 | 29/428 |
| 2016/0176076 A1 * | 6/2016 | Henwood | B32B 5/18 | 428/36.5 |

* cited by examiner

INSULATED REGISTER BOX AND PROCESS FOR FORMING SUCH INSULATED REGISTER BOX

CROSS-REFERENCE TO RELATED APPLICATIONS

The present application is a continuation-in-part of U.S. patent application Ser. No. 15/864,612, filed on Jan. 8, 2018, presently pending. U.S. patent application Ser. No. 15/864,612 is a division of U.S. patent application Ser. No. 14/668,079, filed Mar. 25, 2015, which issued as U.S. Pat. No. 9,951,969 on Apr. 24, 2018. The present application is also a continuation-in-part of U.S. patent application Ser. No. 16/005,235, filed on Jun. 11, 2018, pending. U.S. patent application Ser. No. 16/005,235 is a continuation-in-part of Ser. No. 15/703,436, filed on Sep. 13, 2017, presently pending. U.S. patent application Ser. No. 15/703,436 is a continuation-in-part of U.S. patent application Ser. No. 15/439,454, filed on Feb. 22, 2017, presently pending. U.S. patent application Ser. No. 15/439,454, is a continuation-in-part of U.S. patent application Ser. No. 14/668,079, filed Mar. 25, 2015, which issued as U.S. Pat. No. 9,951,969 on Apr. 24, 2018.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to ductwork for heating, ventilation and air-conditioning (HVAC) systems. More particularly, the present invention relates to register boxes as used in such systems. More particularly, the present invention relates to processes for forming such register boxes.

2. Description of Related Art Including Information Disclosed Under 37 CFR 1.97 and 37 CFR 1.98

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C. Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

U.S. Pat. No. 9,951,969, issued on Apr. 24, 2018 to the present Applicant, describes a register box for an HVAC installation. The register box has a body with a plurality of side panels arranged in a generally rectangular or square configuration and a wall extending across the rectangular configuration. A duct opens to the wall so as to communicate with an interior of the body. An expandable foam polymeric material is affixed to an inner side of the side panels. The wall has a surface extending from the opening of the duct to the side panels. The expandable foamed polymeric material is affixed to the surface of the wall. The expandable polymeric material is polyurethane.

Upon the commercialization of the insulated register box of U.S. Pat. No. 9,951,969, it was determined that certain operations had different sizes of duct and different needs associated with the insulated register box. In particular, in this prior patent, the duct was of particular side and integrated into the structure of the register box. However, difficulties could occur if a customer had a duct system or air movement system which was incompatible with the duct that was incorporated into the structure of the register box. As such, a need developed so as to create a more adaptable register box in which a person can create an opening in the insulated register box that is adapted to the particular ducting and air movement systems to which the insulated register box is applied. In such a situation, it is important that the insulating expandable polymeric material be adaptable so as to generally engage with the exterior of the external ducting to which the insulated register box is applied. This need required the ability to adapt the register box to the ductwork without special tools, installation equipment, or complicated procedures.

It is an object of the present invention to provide a register box which minimizes air loss.

It is another object of the present invention to provide a register box which improves the insulated rating of the register box.

It is another object the present invention to provide a register box that is fire-resistant.

It is another object of the present invention to provide the register box which is compliant with national building codes.

It is another object of the present invention to provide a register box which avoids the use of fibrous insulation.

It is another object of the present invention to provide a register box which improves the health and safety to workers assembling the register box.

It is a further object of the present invention to provide a register box that is register box is very energy efficient.

It is still a further object of the present invention to provide a register box in which the process is very efficient, relatively inexpensive and efficient.

It is still a further object of the present invention to provide an insulated register box which is adaptable to the various needs associated with ductwork and air movement structures and components.

It is another object of the present invention to provide a register box which creates a proper seal around external ducting.

These and other objects and advantages of the present invention will become apparent from a reading of the attached specification and appended claims.

BRIEF SUMMARY OF THE INVENTION

The present invention is a register box for an HVAC installation in which the register box comprises a body having a plurality of side panels arranged in a generally rectangular or square configuration and having a plurality of flanges extending inwardly from the plurality of side panels. An expandable polymeric material is affixed to an inner side of the plurality of side panels. The expandable polymeric material has a portion extending across one end of the body inwardly of the plurality of flanges. A sheet is positioned under the portion of the expandable polymeric material across the one end of the body.

In the register box the present invention, the sheet is interposed between the portion of the expandable polymeric material and the plurality of flanges. The expandable polymeric material defines an opening at an opposite end of the body. The expandable polymeric material has a thickness at each of the plurality of side panels that is approximately equal to a width of each of the plurality of flanges. In the preferred embodiment of the present invention, the sheet is a foil material. In particular, the expandable polymeric material and the sheet are cuttable so as to selectively allow one to open to the interior of the register box. At least one of the side panels has a seam form therein. In the preferred embodiment of the present invention, the expandable polymeric material is polyurethane.

The present invention is also a process for insulating a register box. This process includes the steps of: (1) positioning a sheet of material within the plurality of side panels and against the plurality of flanges; (2) flowing an expandable polymeric material to the plurality of side panels and toward the sheet of material; (3) placing the register box into or onto a support structure; (4) introducing a liner over the flowed expandable polymeric material within the register box; (5) placing a form onto the liner into the register box so as to shape the expandable polymeric material within the register box; and (6) removing the form and the liner from the register box.

In this process, a lid is closed over the form and over an end of the register box so as to limit an expansion of the expandable polymeric material. The lid is locked over the end of the register box for a period of time while the expandable polymeric material expands. The lid is unlocked prior to the step of removing the form and the liner.

The support structure is positioned onto an underlying surface prior to the step of placing the register box. A polymeric sheet is positioned into the interior of the support structure. The plurality of flanges of the register box and the sheet of material are placed on to a top of the polymeric sheet. The support structure is locked so as to be in a fixed position on the underlying surface. The liner is introduced over the flowed expandable polymeric material such that the outer edges of the liner reside outwardly of an end of the register box. The step of removing includes grasping the outer edges of the liner and lifting the liner and the form from the register box. The register box is lifted from the support structure following the step of removing.

In the preferred embodiment the present invention, the underlying surface is a carousel. The carousel is rotated prior to the step of removing. The flowed expandable polymeric material is solidified against the plurality of side panels. The solidified expandable polymeric material has a thickness approximately equal to a width of the flange.

This foregoing Section is intended to describe, with particularity, the preferred embodiment of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
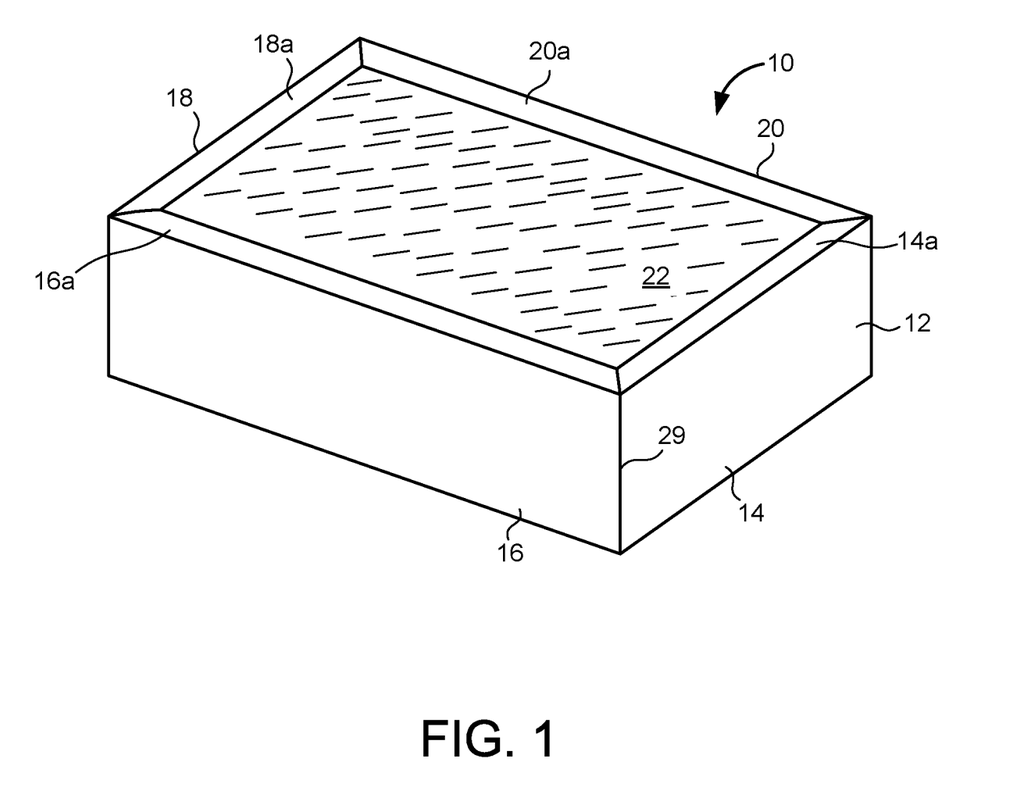
FIG. 1 is a perspective view of the register box in accordance with the present invention.

Referring to FIG. 1, there is shown the insulated register box 10 formed in accordance with the process of the present invention. The register box 10 includes a body 12 having side panels 14, 16, 18 and 20 formed into a generally square or rectangular configuration. A plurality of flanges 14a, 16a, 18a and 20a extend inwardly from and edge of each of the plurality of side panels 14, 16, 18 and 20. A sheet 22 is positioned across the end of the body 12 and against the interior side of each of the flanges 14a, 16a, 18a and 20a. As such, the sheet 22 will extend across the end of the body 12 so as to cover the expandable polymeric material within the body 12. The sheet of material can be a foil material that can be easily cut. The body 12 is formed of a single sheet of metallic material, such as aluminum.

Since the body 12 is formed of a single sheet of metallic material, the register box 10 will have no seems. As such, this avoids the need for any tack welding operations. This minimizes the amount of time required for the formation of the body 12. The single sheet of metallic material can simply be formed by conventional processes by folding the flange is 14a, 16a, 18a and 20a that right angles with respect to the side panels 14, 16, 18 and 20. This minimizes the amount of labor required for the forming of the body and also minimizes the cost required for forming the body. The present invention involves a minimal number of operations for the forming of the body 12.

Figure 2:
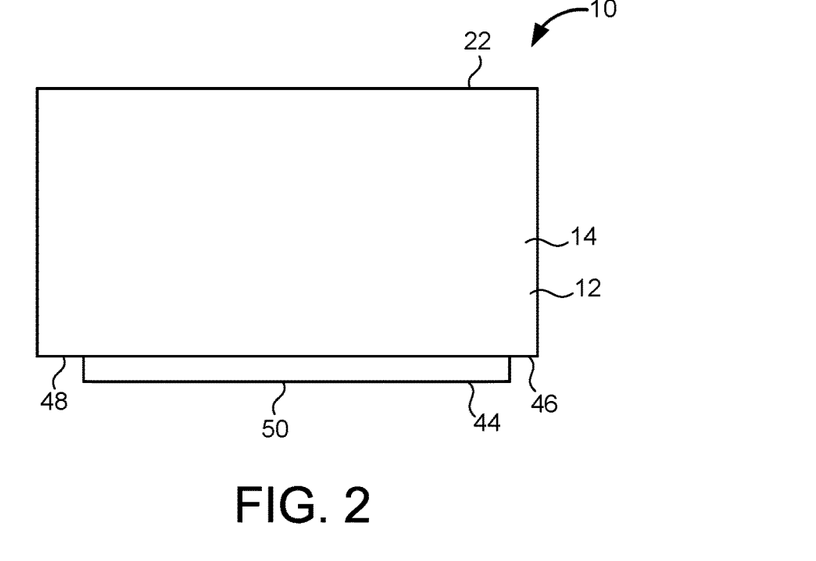
FIG. 2 is a side elevational view of the register box of the present invention.

FIG. 2 shows a side view of the register box 10. As can be seen in FIG. 2, the side panel 14 is particularly illustrated. There is a lip 44 that extends outwardly of the end 46 of the body 12. The lip 44, as will be described hereinafter, extends outwardly of a flange 48. Flange 48 extends inwardly from the side panels 14, 16, 18 and 20 such that the inner edges define an aperture 50 opening to the interior of the body 12.

Figure 3:
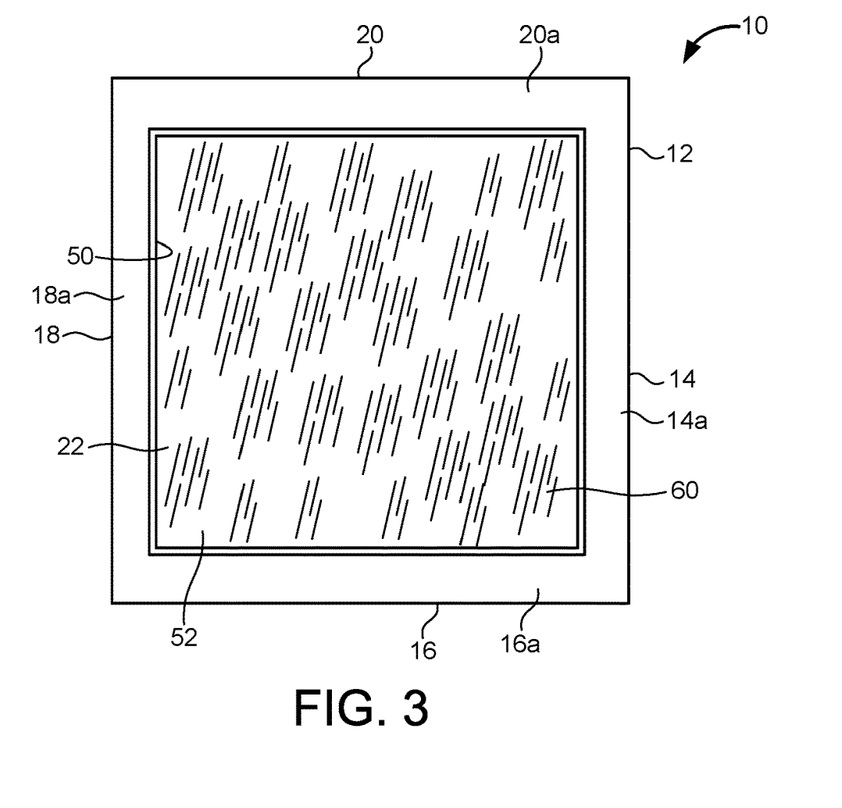
FIG. 3 is an end view of the register box of the present invention.

FIG. 3 is an end view of the register box 10 of the present invention. Sheet 22 is illustrated as located centrally within the flanges 14, 16, 18 and 20. Sheet 22 will overlie the expanded polymeric material within the interior of body 12. The flanges 14, 16, 18 and 20 define a generally central area into which the sheet of foil material 22 resides. In normal use, when it is desired to adapt the insulated register box 10 to a particular size of ductwork or other air moving equipment, the sheet 22, along with the expanded polymeric material, can be easily cut with a knife to the desired dimensions of the duct or tubular to which the insulated register box 10 is to be connected. The surface-to-surface contact between the expanded polymeric material on the interior of the register box 10 will tightly conform to the exterior of any duct or tubular that would extend through the opening formed in the sheet 22.

FIG. 3 shows the nature of the flanges 14*a*, 16*a*, 18*a* and 20*a*. These flanges 14*a*, 16*a*, 18*a* and 20*a* extend around the interior of the body 12. Each of the flanges has a similar width. In accordance with the present invention, and as will be described in association with FIG. 4, the expanded polymeric material will reside against the side panels 14, 16, 18 and 20 and have a thickness approximately equal to the width of the flanges 14*a*, 16*a*, 18*a* and 20*a*.

Figure 4:
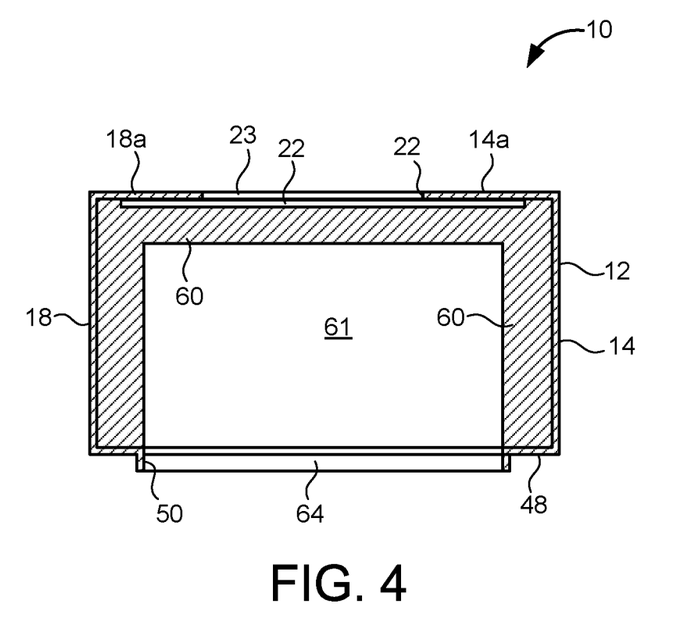
FIG. 4 is a cross-sectional view of the register box of the present invention.

FIG. 4 is a cross-sectional view of the register box 10 of the present invention. As can be seen in FIG. 4, the expanded polymeric material 60 is illustrated as positioned against the side panels 14 and 18. A similar configuration will occur with respect to side panels 16 and 20. The expanded polymeric material is illustrated as having a thickness approximately equal to the width dimension of the flanges 14*a* and 18*a*. The sheet 22 is interposed between the expanded polymeric material 60 and each of the flanges 14*a* and 18*a*. As such, the sheet of material 22 will be properly retained in a position adjacent to an opening 23 at the end of the body 12. The expanded polymeric material 60 will define an interior 61. An aperture 64 also opens at the opposite end of the body 12 to the interior 61.

As was described herein previously, when a person desires to fit the insulated register box 10 to existing ductwork or air moving facilities, is only necessary to form a hole through the sheet 22 and through the expanded polymeric material so as to access the interior 61. The insulated register box 10 can then be fit to existing ductwork. The expanded polymeric material 60 serves as insulation. This insulation is compliant with national building codes, is fire resistant, and also avoids the use of fibrous insulation material. As such, this type of material, since it avoids the fibrous material in the assembly procedures, it will improve the health and safety of workers that assemble the register box 10. The insulation created by the expanded polymeric material 60 does not require any alterations in the structure of the body 12. The insulation material causes the register box 10 to be very energy efficient.

Figure 5:
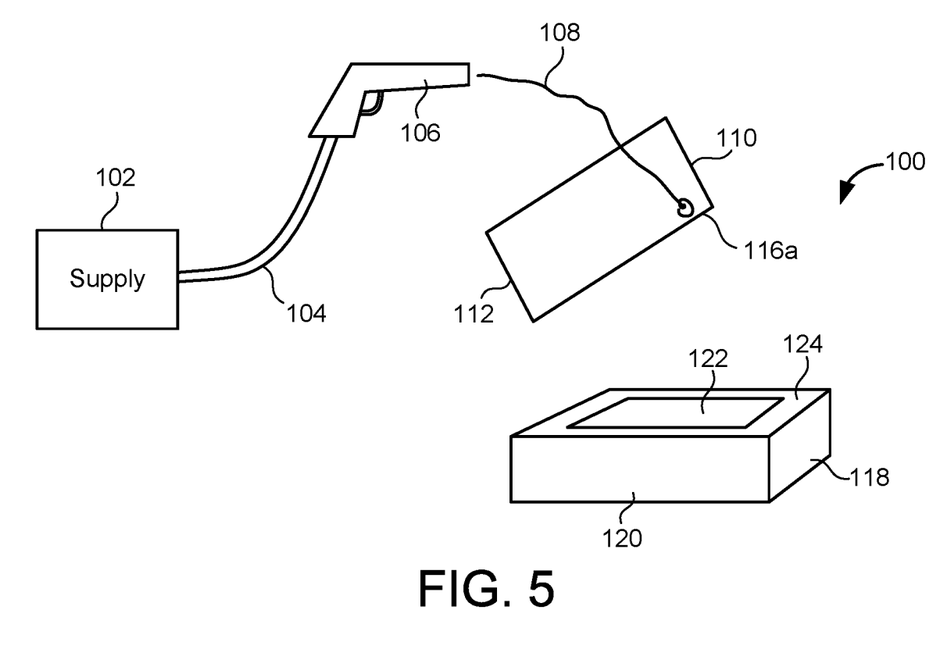
FIG. 5 shows an initial step in the forming of the insulated register box of the present invention.

FIG. 5 illustrates an early step in the process of forming the register box of the type shown in FIGS. 1-4. In FIG. 5, it can be seen that there is a supply 102 of the expandable polymeric material. The expandable polymeric material, in the preferred embodiment of the present invention, is polyurethane. A conduit 104 extends from the supply 102 to a foam gun 106. As such, the foam gun 106 will inject foamed expandable polymeric material 108 toward the interior of the register box 110. The register box 110 includes a plurality of side panels 112 arranged in a generally rectangular configuration of the type described hereinbefore. It can be seen that the foamed expandable polymeric material, is flowed generally toward the flanges 116*a* and also around the plurality of side panels 112. The register box 110 is maintained and moved at an angle so as to allow the person operating the foam gun 106 to direct the foam expandable polymeric material 108 generally around the interior of each of the plurality of side panels 112.

A support structure 118 is illustrated as located below the register box 110. In the preferred embodiment of the present invention, the support structure 118 is a frame that has sides 120 and an interior 122. After the foamed expandable polymeric material is directed generally around the side panels 112 and the flanges 116*a*, the register box 110 will be introduced into the interior 122 of support structure 118 or onto the support structure.

Figure 6:
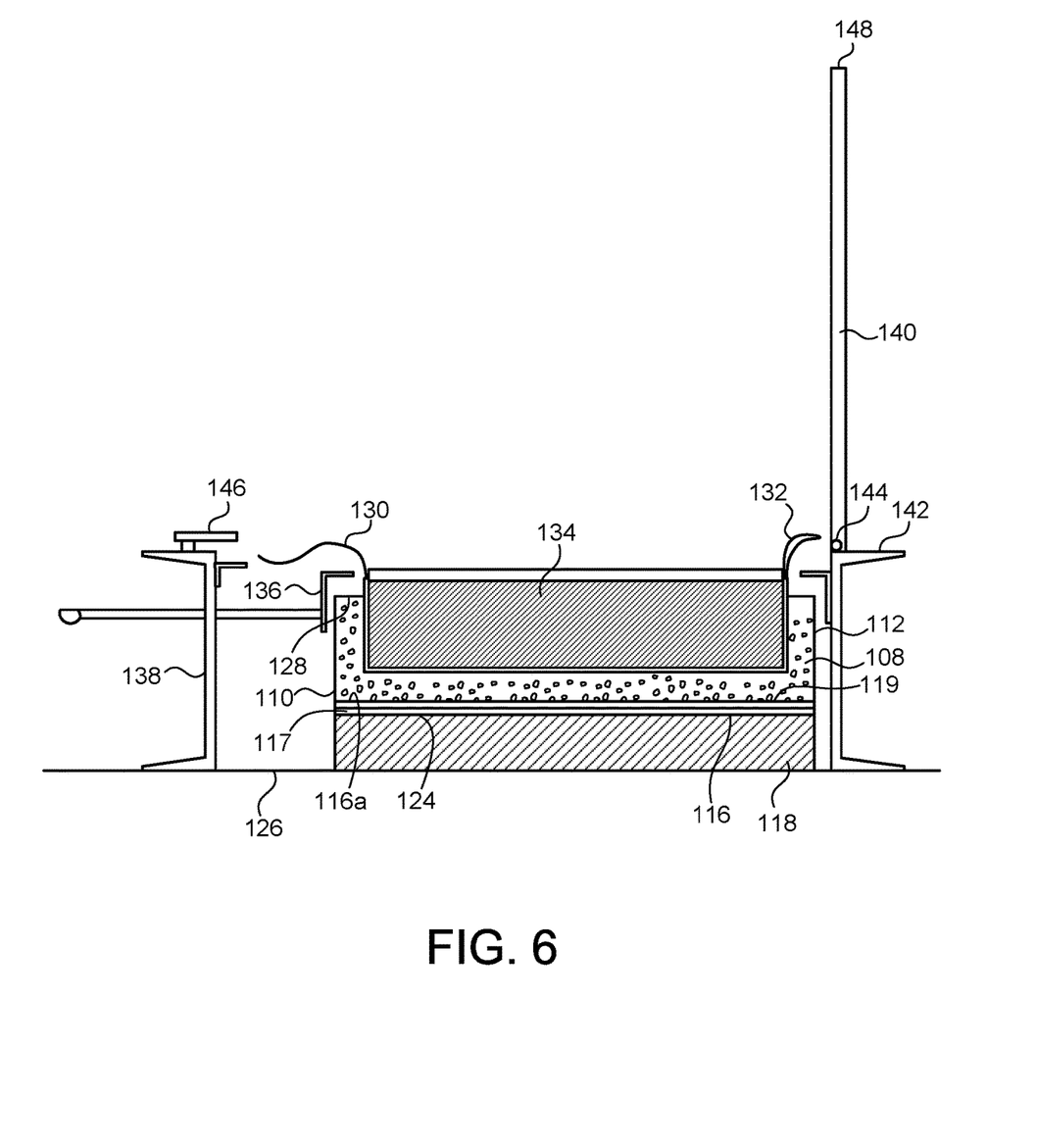
FIG. 6 shows a further step of the process of forming the insulated register box of the present invention.

In FIG. 6, the support structure 118 is placed upon an underlying surface 126. As will be described hereinafter, in the preferred embodiment of the present invention, the support structure 126 can be a carousel. The flanges 116*a* can be placed directly upon a polymeric sheet 117 located on the top of the support structure 118. The polymeric material of the sheet 117 will prevent any adhesion that may occur between the expanded polymeric material 108 and the support structure 118. The sheet of foil material 119 has been previously placed upon the flanges 116*a*. The sheet of foil material 119 can be placed upon the inner surface of the flanges 116*a* prior to the introduction onto the support structure 118. The foamed expandable polymeric material 108 is illustrated as residing against the plurality of side panels 112 and over the sheet of foil material 119 and over the flanges 116*a*.

In FIG. 6, it can be seen that the register box 110 has flanges 128 that extend inwardly from the plurality of side panels 112. Flanges 128 will extend inwardly from an edge of the side panels 112 opposite the sheet of foil material 119. Flanges 128 can define an aperture of the register box 110.

With reference to FIG. 6, after the foamed expandable polymeric material 108 has been introduced into the interior of the register box 110, a liner 130 is placed over the expandable polymeric material. The liner 130 will include edges 132 which extend outwardly of the register box 110. As such, these edges 132 can provide a grasping surface. A form 134 is then placed upon the liner 130 and into the interior of the register box 110. The form 134 is a metal plug. The form 134 is intended to shape the insulation of the register box 110. As such, it will have a shape that corresponds to the intended shape of the insulation on the interior of the register box 110. As described herein, the liner 130 can be a plastic sheet or it can be a surface that is formed on the form 134. The purpose of the liner 130 is to allow the separation of the form 134 from the solidified expanded polymeric material 108.

An adjustable hold-down 136 is maintained by a support 138. Adjustable hold-down 136 serves to secure the register box 110 on the support structure 118 and also to maintain the register box 110 and the support structure 118 upon the underlying surface 126. A lid 140 is illustrated as extending upwardly from a member 142. The lid 140 is connected to the member 142 by a hinge 144. Member 142 extends upwardly from the underlying surface 126 in proximity to one of the panels of the register box 110. A latch 146 is located adjacent to an opposite side of the register box 110. Latch 146, as will be described hereinafter, serves to receive the end 148 of the lid 140 so as to lock the lid 148 in positioned over the form 134 and over the top of the register box 110.

Figure 7:
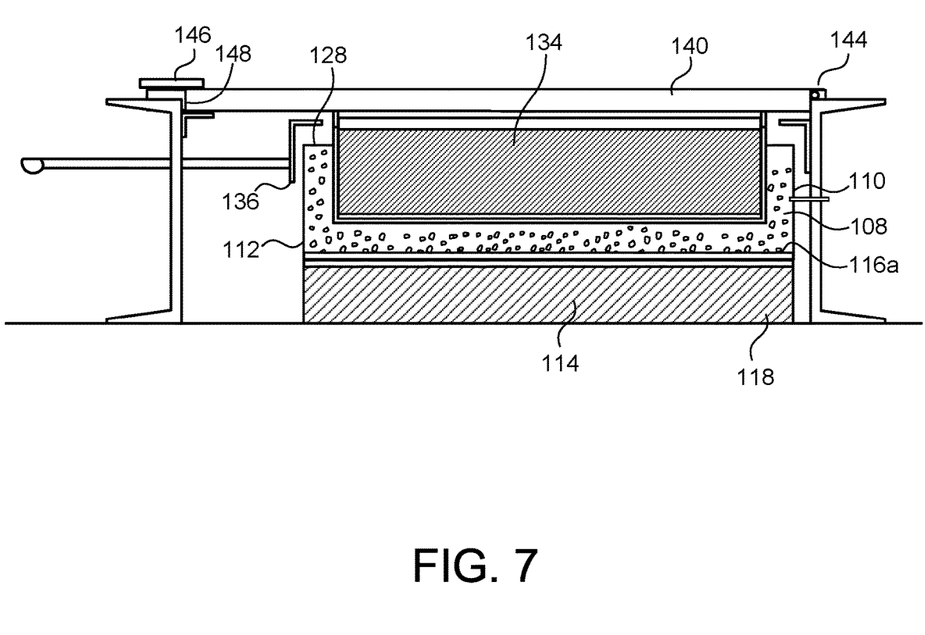
FIG. 7 shows a further step in the forming of the insulated register box of the present invention.

FIG. 7 shows a further step in the process of the present invention. In FIG. 7, it can be seen that the lid 140 is pivoted downwardly about the hinge 144 so as to be juxtaposed against the top of the form 134. The end 148 is locked in position by the latch 146. Importantly, in this configuration, the lid 140 provides resistance against the expansion of the expandable polymeric material 108 within the register box 110. As such, the expandable polymeric material 108 can properly solidify in a desired configuration within the interior of the register box 110. This is important since polyurethane has generally irregular expansion characteristics. The lid 140 will confine this expansion of the expandable polymeric material 108 to the shape that is desired so as to form the installation of the register box 110.

After the expandable polymeric material 108 has solidified, the lid 140 can be pivoted upwardly and unlatched from latch 146. With reference to FIG. 6, the outwardly extending edges 132 can be grasped and lifted upwardly so as to remove the form 134 from the interior of the register box 110. The solidified polymer material 108 will have the desired shape and configuration shown in FIGS. 1-4. Ultimately, the adjustable hold-down 136 can be moved away from the register box 110 so as to allow the register box 110 to be lifted upwardly and removed from the support structure 118. As such, a properly formed register box is achieved. As was described hereinafter, the solidified expandable polymeric material 108 will have a thickness at the side panels 112 generally equal to the width of the flange 128. Similarly, the expandable polymeric material 108 will have a suitable thickness at the plurality of flanges (116a) approximately equal to a width of the flange.

The expanded polymeric material 108 can include portions that emerge through small cracks or gaps in the seams associated with the register box 110, as described hereinbefore. In particular, the solidified expanded polymeric material 108 can flow outwardly through the small seams that exists in the wall 114 of the register box 110.

The process of the present invention greatly improves the efficiency of the production of insulated register boxes. In the past, a great deal of manual activity was required so as to install the fibrous insulating material against the various side panels and wall of the register box. In the present invention, since fibrous insulating material is not required, the present invention can rapidly create insulated register boxes.

Figure 8:
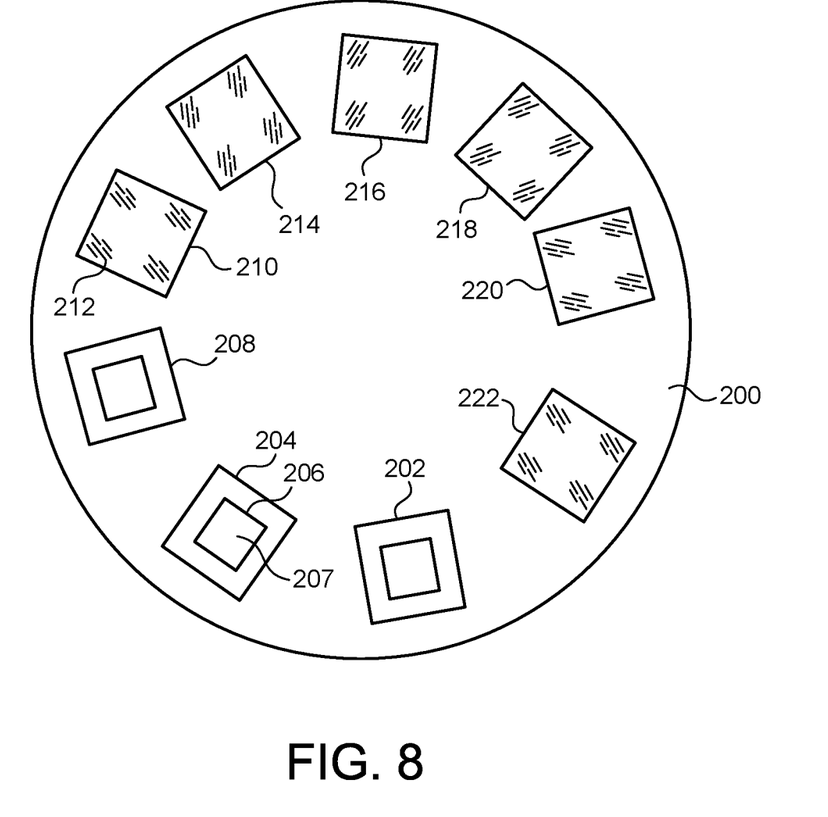
FIG. 8 is a plan view showing a carousel as used in the process of forming the register box of the present invention.

FIG. 8 shows a carousel 200 that is provided with a plurality of the support structures 202, 204, 208, 210, 214, 216, 218, 220, and 222. Support structures 202, 204 and 208 are illustrated in a position prior to receiving the register box therein. As such, the support structure 204 will have an interior 207 which serves to receive the register box.

The support structure 210 has the register box 212 therein. This register box 212 is formed in accordance with the teachings of the present invention hereinbefore. As one register box 212 is initially formed, it can be rotated on the carousel 200 so as to move to another position. As such, another insulated register box can be placed onto the support structure 208 and the process carried out thereafter. That carousel 200 will continue to rotate until the insulated register box 224 reaches and end of the rotation of the carousel 200. As such, a worker can lift the register box 224 from the support structure 222 for the purposes of storing the complete register box. Thereafter, another register box can be introduced onto the support structure 222 and the process continues onward. Unlike previous insulated register boxes, the process of the present invention greatly facilitates the ability to stack. Since the expanded polymeric material will solidify in approximately two minutes, the process associated with carousel 200 is relatively rapid.

Figure 9:
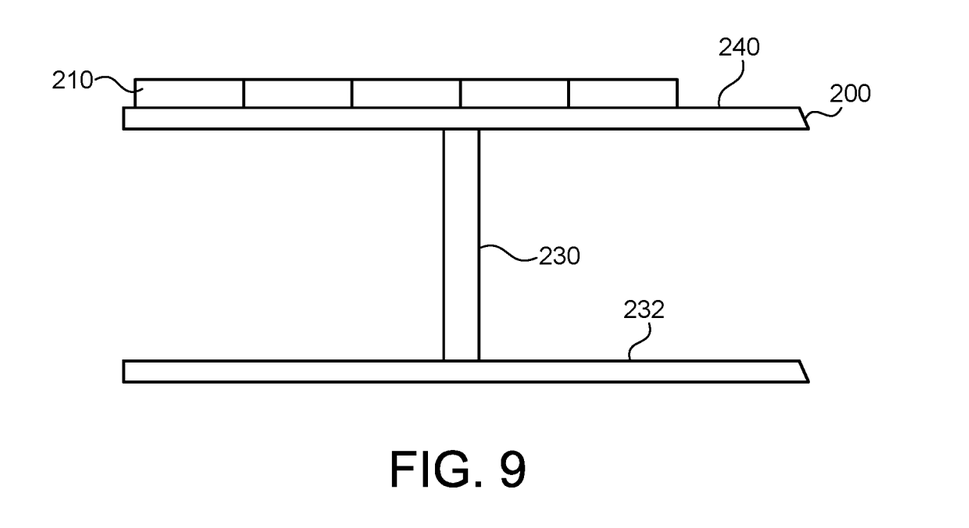
FIG. 9 is a side elevational view of the carousel and support structure as used in the formation of the insulated register box of the present invention.

FIG. 9 is a side view showing the arrangement of the carousel 200 and the various register boxes and support structures 210 thereon. In particular, in FIG. 9, it can be seen that the carousel 200 is rotatably mounted on a support 230. The support 230 is maintained in an upright position by a base 232. Each of the support structures 210 (including the register boxes thereon) are arranged on the top surface 240 of the carousel 200.

Figure 10:
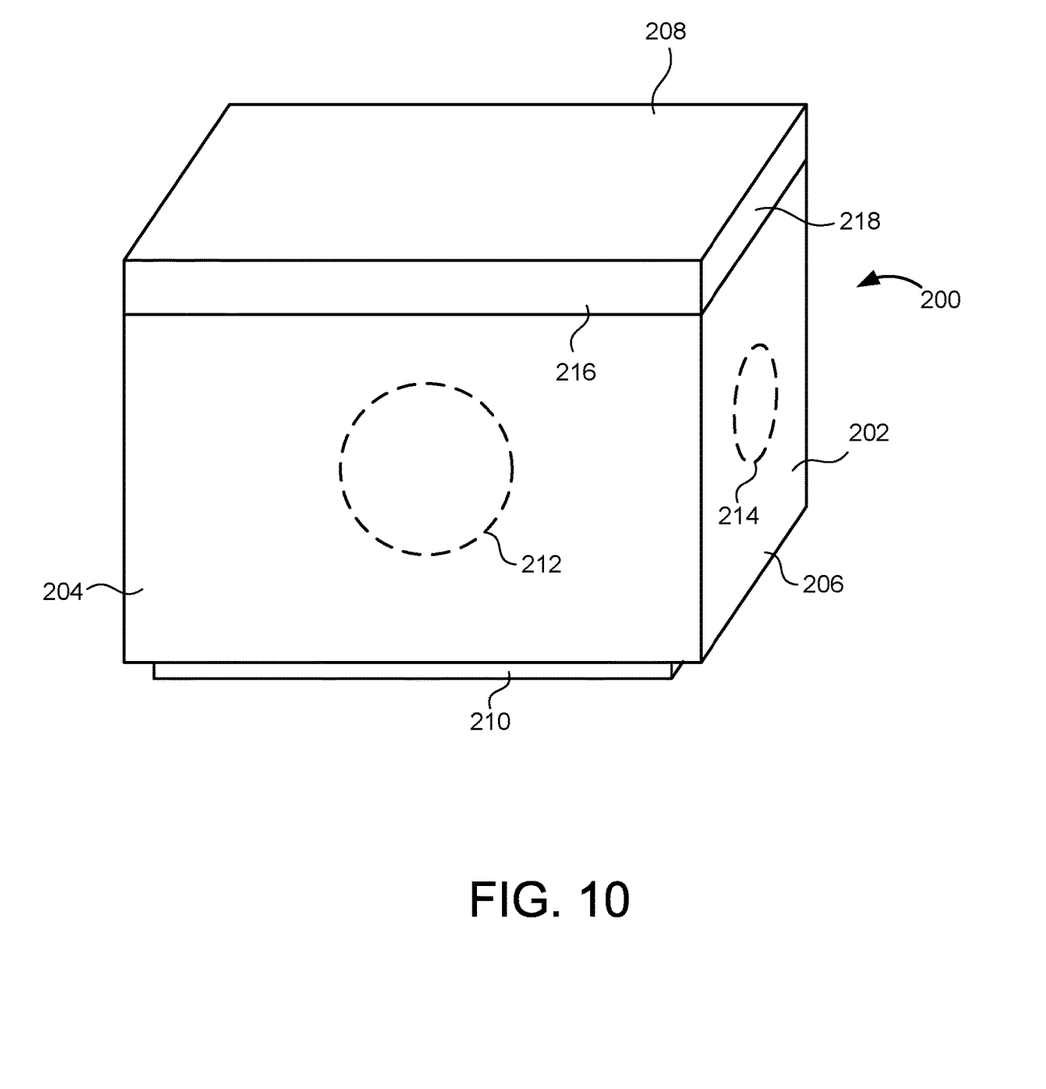
FIG. 10 is an upper perspective view of an alternative embodiment of the insulated register box of the present invention.

FIG. 10 shows an alternative embodiment of the register box 200 in accordance with the present invention. The register box 200 includes a body 202 having a plurality of side panels 204 and 206 arranged in a generally rectangular or square configuration. An end panel 208 extends over the plurality of side panels 204 and 206 so as to generally enclose one end of the body 202. An expandable polymeric material, as described in the previous embodiments of the present invention, is affixed to an inner side of each of the plurality of side panels 204 and 206 (including the side panels not illustrated in FIG. 10). The expandable polymeric material is also affixed to an inner side of the end panel 208 so as to extend entirely thereacross. As with the previous embodiments of the present invention, the expandable polymeric material defines an opening within the body 202 that opens at an end 210 opposite the end panel 208. The body 202 and the expandable polymeric material are cuttable so as to expose the opening through at least one of the plurality of side panels 204 and 206 and the end panel 208.

In FIG. 10, the broken lines 212 and 214 illustrate the manner in which a hole can be formed in the respective side panels 204 and 206 and through the expandable polymeric material on the inside of each of the side panels 204 and 206. Alternatively, if desired, a similar type of hole can be formed through the end panel 208. As such, the opening on the interior of the expandable polymeric material is exposed through the side panels 204 and 206.

It can be seen that the end panel 208 has flanges 216 and 218 (including flanges that are not shown in FIG. 10 on the other sides of the end panel 208). These flanges 216 in 218 will extend over the respective side panels 204 and 206. As such, during assembly, the end panel 208 is simply placed onto an over the end of the body 212. Tack welding can be used so as to affix the flanges 216 and 218 to the respective side panels 204 and 206 of the body 202.

The embodiment of the register box 200, as shown in FIG. 10, is particularly configured for adaptation to the existing ductwork of the HVAC system. Often, the arrangement of the ductwork can vary considerably from location to location. As such, if it is desired to access the opening of the expandable polymeric material on the interior of the register box 200, a worker can simply cut a hole (such as holes 212 and 214) through one of the side panels 204 and 206 and through the expandable polymeric material on the inside of each of the side panels. As such, the opening on the interior of the register box 200 is accessible through one of the side panels. Existing ductwork can then be placed through the hole that is been formed through the side panel. The configuration of the expandable polymeric material on the inside of the body 202 will form a seal with the exterior of any ductwork that is inserted through either of the holes 212 and 214. As such, the register box 200 is particularly adaptable for on-site installation.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. A process for insulating a register box, the register box having a plurality of side panels arranged in a generally rectangular configuration and a plurality of flanges extending inwardly of said plurality of side panels at one end of the register box, the process comprising:

positioning a sheet of material within said plurality of side panels and against said plurality of flanges;

flowing an expandable polymeric material toward said plurality of side panels and toward the sheet of material;

placing the register box into or onto a support structure;

introducing a liner over the flowed expandable polymeric material within the register box;

placing a form onto the liner into the register box so as to shape the expandable polymeric material within the register box; and removing the form and the liner from the register box.

2. The process of claim 1, further comprising:

closing a lid over said form and over an end of the register box so as to limit an expansion of the expandable polymeric material.

3. The process of claim 2, further comprising:

locking said lid over the end of the register box for a period of time while the expandable polymeric material expands.

4. The process of claim 1, further comprising;

positioning said support structure onto an underlying surface prior to the step of placing the register box.

5. The process of claim 1, the step of introducing said liner comprising:

introducing said liner over the flowed expandable polymeric material such that outer edges of said liner reside outwardly of an end of the register box.

6. The process of claim 1, further comprising:

solidifying the flowed expandable polymeric material against the plurality of side panels such that the sheet of material is retained between the solidified polymeric material and the inner surface of the plurality of flanges.

7. The process of claim 6, the plurality of flanges defining in an aperture, the step of solidifying comprising:

solidifying the expandable polymeric material against the plurality of side panels such that the solidified expandable polymeric material has a thickness approximately equal to a width of the flange.

8. The process of claim 1, further comprising:

forming the register box from a single sheet of metallic material by bending the plurality of flanges inwardly respectively from the plurality of side panels.

* * * * *